Aug. 12, 1969  R. F. BODDEY  3,460,606
METHOD OF FORMING A CASTING MOLD
Filed July 8, 1966
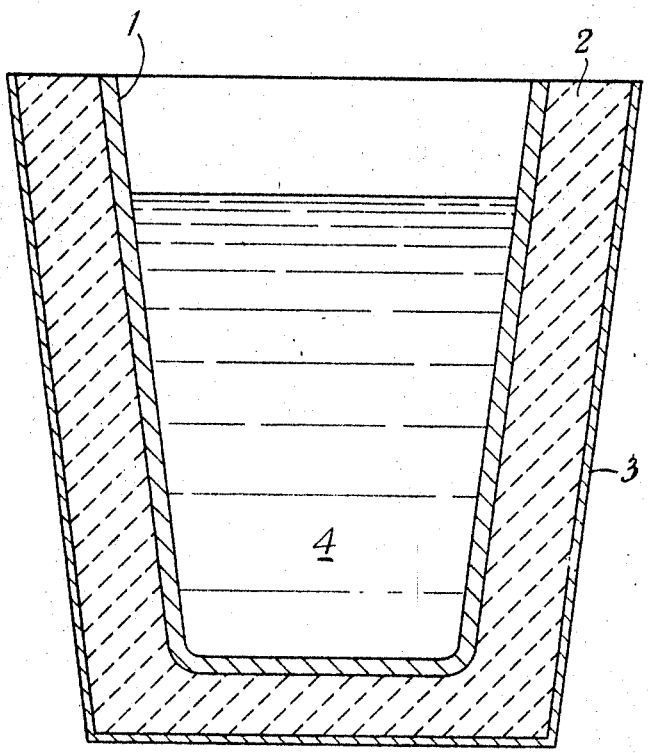
INVENTOR
RONALD FREDERICK BODDEY
by: Wolfe, Hubbard, Voit & Osann
ATTYS.

United States Patent Office

3,460,606
Patented Aug. 12, 1969

3,460,606
METHOD OF FORMING A CASTING MOLD
Ronald Frederick Boddey, Birmingham, England, assignor to Foseco International Limited, Birmingham, England, a British company
Filed July 8, 1966, Ser. No. 563,846
Claims priority, application Great Britain, July 19, 1965, 30,603/65
Int. Cl. B22d 33/04; B22c 9/12, 1/22
U.S. Cl. 164—137      7 Claims

ABSTRACT OF THE DISCLOSURE

A method of forming a casting mould comprising dewatering an aqueous slurry of particulate refractory material, organic fibrous material and binder onto a mesh former of the shape of the article to be moulded, removing the shape so formed from the former, drying it and backing it up with bonded or unbonded particulate refractory material.

---

This invention relates to the production of moulds for metal casting.

Moulds for metal casting are commonly made of metal or refractory material, e.g. bonded sand. It is an object of the present invention to provide moulds for metal casting which are formed of a composition novel for the purpose and which can be readily and cheaply produced.

According to a first feature of the present invention a mould for metal casting comprises a vessel adapted to hold molten metal and formed of a composition comprising particulate refractory material and organic fibrous material bonded together, the said vessel being surrounded with and supported by packed particulate refractory material. The particulate refractory material may be bonded or unbonded.

If the supporting material is bonded the binder may be of any of the well known organic or inorganic binders used for bonding foundry moulds and cores, e.g. clay, silicate or resin.

The composition of which the vessel is formed preferably comprises

|  | Percent |
|---|---|
| Refractory material | 97–65 |
| Organic fibrous material | 2–25 |
| Binder | 1–10 |

The refractory material may be any such as are known for use in foundry practice, examples being sand, grog, chamotte, sillimanite, alumina or any refractory silicate. The organic fibrous material is preferably cellulose, most conveniently in the form of a paper pulp, e.g. repulped newsprint. The binder may be inorganic e.g. sodium silicate, a clay such as bentonite, or may be an organic binder such as sulphite lye, a gum or a synthetic resin.

The composition may contain other ingredients as desired, e.g. fibrous refractory material such as asbestos, glass wool or the like.

The particulate bonded or unbonded, refractory material used as a supporting backing to the vessel of the mould may be, for example, any of the refractory materials referred to above.

According to a further feature of the present invention there is provided a method for the production of a mould for metal casting which comprises forming an aqueous slurry of particulate refractory material and organic fibrous material, together with a binder, charging the slurry into a chamber having walls formed of mesh material of the shape of the required mould, positioning the chamber so that the slurry lies against the mesh, expressing the liquid medium of the slurry through the mesh, thereby to deposit on the mesh a mould-shaped compacted body of the solid constituents of the slurry and occluding some of the aqueous medium, removing the mould-shaped compacted body from the chamber, drying it and providing for it a supporting backing of bonded or unbonded particulate refractory material.

Preferably in the foregoing process the constituents and their proportions are such as to yield mould-shaped vessels of the composition referred to in more detail above.

It is found that by the aforesaid method mould vessels of considerable strength may be obtained very readily and cheaply. Whilst they may, if of sufficient thickness, be sufficiently strong to withstand the pressure of the molten metal when used as moulds in metal casting, they may not always in practice be sufficiently strong when used alone and the present invention accordingly provides that they should be backed and supported in use, by packed, bonded or unbonded, refractory material. It will be appreciated that whilst the vessels may in use be so affected by the molten metal that they cannot be used a second time, yet they are so cheaply made that they can be discarded on an economical basis, while the supporting backing of refractory material may be used repeatedly with successive mould-vessels of the character described.

A mould structure according to the present invention is illustrated in the accompanying drawing in which a vessel 1, made of a composition as hereinbefore defined, is surrounded by a refractory 2 packed in the space between the vessel 1 and the outer shell 3, e.g. of thin steel. Molten metal is shown in the vessel at 4.

I claim as my invention:

1. In a method for the production of a mould for casting which consists of a mould vessel having a supporting external backing of particulate refractory materials, the steps of forming an aqueous slurry of particulate refractory material, organic fibrous material and a binder, charging the slurry into a chamber having walls formed of mesh material and of the shape of the require mould, expressing the aqueous medium of the slurry through through the mesh thereby to deposit on the mesh a mould vessel formed from the compacted solid constituents of the slurry, said mould vessel having a bottom wall and integral side walls extending upwardly from said bottom wall, removing the mould vessel from the chamber, drying the mould vessel and locating around the mould vessel a supporting backing of packed particulate refractory material.

2. A method as set forth in claim 1 wherein the slurry contains, apart from the aqueous medium, from about 65% to about 97% by weight refractory material, from about 2% to about 25% by weight organic fibrous material, and from about 1% to about 10% by weight binder.

3. A method as set forth in claim 1 wherein the organic fibrous material of the slurry is paper pulp.

4. A method as set forth in claim 1 wherein the particulate refractory material of the slurry is sand.

5. A method as set forth in claim 1 wherein the binder of said slurry is selected from the group consisting of sodium silicate, clay, sulphite lye, gum and resin.

6. A method as set forth in claim 1 wherein the packed particulate refractory material is sand.

7. In a method for metal casting, the steps of forming an aqueous slurry of particulate refractory material, organic fibrous material and a binder, charging the slurry into a chamber having walls formed of mesh material and of the shape of the required mould, expressing the aqueous medium of the slurry through the mesh thereby to deposit on the mesh a mould vessel formed from the compacted solid constituents of the slurry, said mould vessel having a bottom wall and integral side walls extending upwardly from said bottom wall, removing the mould vessel from the chamber, drying the mould vessel and locating around the mould vessel a supporting backing of packed particulate refractory material, and casting molten metal in said mould vessel to form a moulded article.

References Cited

UNITED STATES PATENTS

| | | | |
|---|---|---|---|
| 2,239,530 | 4/1941 | Langenohl et al. | 164—33 X |
| 2,858,589 | 11/1958 | Bean | 164—138 |
| 3,379,804 | 4/1968 | Loosjes et al. | 264—87 |
| 2,863,192 | 12/1958 | Kauffman | 249—201 X |
| 2,884,333 | 4/1959 | Karr et al. | 106—38.5 |
| 3,204,303 | 9/1965 | Chandley | 164—23 |

FOREIGN PATENTS 693,558  9/1964  Canada.

J. SPENCER OVERHOLSER, Primary Examiner

E. MAR, Assistant Examiner

U.S. Cl. X.R.

106—38; 164—25, 33, 43, 138; 249—201